US006457367B1

(12) United States Patent
Behm et al.

(10) Patent No.: US 6,457,367 B1
(45) Date of Patent: Oct. 1, 2002

(54) SCALABLE PROCESS TRANSMITTER

(75) Inventors: Steven M. Behm, White Bear Lake; Dale S. Davis, Prior Lake; Mark C. Fandrey, Eden Prairie; Roger L. Frick, Hackensack; Robert C. Hedtke, Young America; Richard L. Nelson, Chanhassen; Scott D. Nelson, Plymouth; Weston Roper, St. Louis Park; Theodore H. Schnaare, Chaska; John P. Schulte, Eden Prairie; Mark S. Shumacher, Minneapolis, all of MN (US)

(73) Assignee: Rosemount Inc., Eden Praire, MN (US)

( * ) Notice: Subject to any disclaimer, the term of this patent is extended or adjusted under 35 U.S.C. 154(b) by 0 days.

(21) Appl. No.: 09/671,495

(22) Filed: Sep. 27, 2000

Related U.S. Application Data

(60) Provisional application No. 60/156,369, filed on Sep. 28, 1999.

(51) Int. Cl.$^7$ ................................................ G01L 9/00
(52) U.S. Cl. ...................................................... 73/753
(58) Field of Search ........................ 73/1.63, 706, 708, 73/720–727, 756, 431, 753; 361/283.1–283.4, 816; 338/2, 4, 42; 340/626, 870.11, 870.21, 825.07

(56) References Cited

U.S. PATENT DOCUMENTS

| 3,701,280 A | 10/1972 | Stroman ...................... 73/194 |
| 3,968,694 A | 7/1976 | Clark ........................... 73/398 |
| 4,120,206 A | 10/1978 | Rud, Jr. ........................ 73/718 |
| 4,125,027 A | 11/1978 | Clark ........................... 73/724 |
| 4,238,825 A | 12/1980 | Geery ......................... 364/510 |
| 4,250,490 A | 2/1981 | Dahlke .................. 340/870.37 |
| 4,287,501 A | 9/1981 | Tominaga et al. ............ 338/42 |
| 4,414,634 A | 11/1983 | Louis et al. ................. 364/510 |
| 4,419,898 A | 12/1983 | Zanker et al. ........... 73/861.02 |
| 4,446,730 A | 5/1984 | Smith .......................... 73/301 |

(List continued on next page.)

FOREIGN PATENT DOCUMENTS

| DE | 37 41 648 A1 | 7/1988 |
| DE | 91 09 176.4 | 10/1991 |
| DE | 295 45 244 A1 | 4/1998 |
| DE | 299 03 260 U1 | 5/2000 |
| EP | 0 063 685 A1 | 11/1982 |

(List continued on next page.)

OTHER PUBLICATIONS

"Notification of Transmittal of the International Search Report or the Declaration" of International Application No. PCT/US00/26563.

"Notification of Transmittal of the International Search Report or the Declaration" for International Application No. PCT/US00/26488. (No Date).

2 pages downloaded from http://www.interlinkbt.com/PRODUCT/IBT_PROD/DN/CN–DM_PN/EURO–D-P.HTM dated Sep. 15, 2000.

(List continued on next page.)

Primary Examiner—William Oen
(74) Attorney, Agent, or Firm—Westman, Champlin & Kelly, P.A.

(57) ABSTRACT

A scalable process transmitter architecture includes a unitized sensor module and an optional scalable transmitter. The sensor module has a sensor output that is configurable which can connect locally to a scalable transmitter module to form a transmitter, or can be wired directly to a remote receiver. The scalable transmitter can mount on the unitized sensor module and generates a scalable output for a remote receiver. The transmitter module can provide more advanced features for specific applications.

57 Claims, 13 Drawing Sheets

U.S. PATENT DOCUMENTS

| | | | | |
|---|---|---|---|---|
| 4,455,875 | A | 6/1984 | Guimard et al. | 73/708 |
| 4,485,673 | A | 12/1984 | Stern | 73/304 |
| 4,528,855 | A | 7/1985 | Singh | 73/721 |
| 4,562,744 | A | 1/1986 | Hall et al. | 73/861.02 |
| 4,598,381 | A | 7/1986 | Cucci | 364/558 |
| 4,602,344 | A | 7/1986 | Ferretti et al. | 364/509 |
| D287,827 | S | 1/1987 | Broden | D10/46 |
| 4,644,797 | A | 2/1987 | Ichikawa et al. | 73/706 |
| 4,653,330 | A | 3/1987 | Hedtke | 73/756 |
| 4,677,841 | A | 7/1987 | Kennedy | 73/30 |
| 4,745,810 | A | 5/1988 | Pierce et al. | 73/706 |
| D296,995 | S | 8/1988 | Lee | D10/46 |
| D297,314 | S | 8/1988 | Hedtke | D10/46 |
| D297,315 | S | 8/1988 | Pierce et al. | D10/85 |
| 4,783,659 | A | 11/1988 | Frick | 340/870.37 |
| 4,791,352 | A | 12/1988 | Frick et al. | 324/60 |
| 4,798,089 | A | 1/1989 | Frick et al. | 73/706 |
| 4,818,994 | A | 4/1989 | Orth et al. | 340/870.21 |
| 4,825,704 | A | 5/1989 | Aoshima et al. | 73/861.42 |
| 4,833,922 | A | 5/1989 | Frick et al. | 73/756 |
| 4,850,227 | A | 7/1989 | Luettgen et al. | 73/708 |
| 4,866,989 | A | 9/1989 | Lawless | 73/756 |
| 4,881,412 | A | 11/1989 | Northedge | 73/861.04 |
| 4,930,353 | A | 6/1990 | Kato et al. | 73/727 |
| 4,958,938 | A | 9/1990 | Schwartz et al. | 374/208 |
| 4,970,898 | A | 11/1990 | Walish et al. | 73/706 |
| 4,980,675 | A | 12/1990 | Meisenheimer, Jr. | 340/626 |
| 5,000,047 | A | 3/1991 | Kato et al. | 73/706 |
| D317,266 | S | 6/1991 | Broden et al. | D10/46 |
| D317,269 | S | 6/1991 | Selg | D10/52 |
| D318,432 | S | 7/1991 | Broden et al. | D10/46 |
| 5,028,746 | A | 7/1991 | Petrich | 191/12.2 R |
| 5,035,140 | A | 7/1991 | Daniels et al. | 73/290 |
| 5,058,437 | A | 10/1991 | Chaumont et al. | 73/861.21 |
| 5,060,108 | A | 10/1991 | Baker et al. | 361/283 |
| 5,070,732 | A | 12/1991 | Duncan et al. | |
| 5,083,091 | A | 1/1992 | Frick et al. | 324/678 |
| 5,087,871 | A | 2/1992 | Losel | 323/299 |
| 5,094,109 | A | 3/1992 | Dean et al. | 73/718 |
| D329,619 | S | 9/1992 | Cartwright | D10/52 |
| 5,142,914 | A | 9/1992 | Kusakabe et al. | 73/723 |
| 5,157,972 | A | 10/1992 | Broden et al. | 73/706 |
| 5,162,725 | A | 11/1992 | Hodson et al. | 324/115 |
| 5,187,474 | A | 2/1993 | Kielb et al. | 340/870.18 |
| 5,212,645 | A | 5/1993 | Wildes et al. | 364/463 |
| 5,227,782 | A | 7/1993 | Nelson | 340/870.11 |
| 5,236,202 | A | 8/1993 | Krouth et al. | 277/164 |
| 5,245,333 | A | 9/1993 | Anderson et al. | 340/870.3 |
| D342,456 | S | 12/1993 | Miller et al. | D10/52 |
| 5,287,746 | A | 2/1994 | Broden | 73/706 |
| 5,353,200 | A | 10/1994 | Bodin et al. | 361/816 |
| 5,369,386 | A | 11/1994 | Alden et al. | 335/206 |
| 5,377,547 | A | 1/1995 | Kusakabe et al. | 73/723 |
| 5,381,355 | A | 1/1995 | Birangi et al. | 364/724.01 |
| D358,784 | S | 5/1995 | Templin, Jr. et al. | 10/96 |
| 5,436,824 | A | 7/1995 | Royner et al. | 363/89 |
| 5,448,180 | A | 9/1995 | Kienzler et al. | 326/15 |
| 5,469,150 | A | 11/1995 | Sitte | 340/825.07 |
| 5,471,885 | A | 12/1995 | Wagner | 73/862.041 |
| D366,000 | S | 1/1996 | Karas et al. | D10/60 |
| D366,218 | S | 1/1996 | Price et al. | D10/52 |
| 5,495,768 | A | 3/1996 | Louwagie et al. | 73/706 |
| 5,498,079 | A | 3/1996 | Price | 374/208 |
| 5,524,333 | A | 6/1996 | Hogue et al. | 29/593 |
| 5,524,492 | A | 6/1996 | Frick et al. | 73/706 |
| 5,546,804 | A | 8/1996 | Johnson et al. | 73/431 |
| 5,600,782 | A | 2/1997 | Thomson | 395/182.02 |
| 5,606,513 | A | 2/1997 | Louwagie et al. | 364/510 |
| 5,650,936 | A | 7/1997 | Loucks et al. | 364/483 |
| 5,656,782 | A | 8/1997 | Powell, II et al. | 73/756 |
| 5,665,899 | A | 9/1997 | Willcox | 73/1.63 |
| 5,668,322 | A | 9/1997 | Broden | 73/756 |
| 5,670,722 | A | 9/1997 | Moser et al. | 73/756 |
| 5,710,552 | A | 1/1998 | McCoy et al. | 340/870.21 |
| 5,754,596 | A | 5/1998 | Biscoff et al. | 375/295 |
| 5,764,928 | A | 6/1998 | Loancott | 395/285 |
| 5,823,228 | A | 10/1998 | Chou | 137/597 |
| 5,870,695 | A | 2/1999 | Brown et al. | 702/138 |
| 5,899,692 | A | 5/1999 | Louwagie et al. | 702/138 |
| 5,920,016 | A | 7/1999 | Broden | 73/756 |
| 5,948,988 | A | 9/1999 | Bodin | 73/706 |
| 5,954,526 | A | 9/1999 | Smith | 439/136 |
| 5,955,684 | A | 9/1999 | Gravel et al. | 76/866.5 |
| 5,973,942 | A | 10/1999 | Nelson et al. | 363/21 |
| 5,988,203 | A | 11/1999 | Hutton | 137/597 |
| 6,005,500 | A | 12/1999 | Gaboury et al. | 341/43 |
| 6,006,338 | A | 12/1999 | Longsdorf et al. | 713/340 |
| 6,038,927 | A | 3/2000 | Karas | 73/706 |
| 6,050,145 | A | 4/2000 | Olson et al. | 73/706 |
| 6,059,254 | A | 5/2000 | Sundet et al. | 248/678 |
| 6,105,437 | A | 8/2000 | Klug et al. | 73/756 |
| 6,111,888 | A | 8/2000 | Green et al. | 370/461 |
| 6,115,831 | A | 9/2000 | Hanf et al. | 714/43 |
| 6,123,585 | A | 9/2000 | Hussong et al. | 439/652 |
| 6,140,952 | A | 10/2000 | Gaboury | 341/143 |
| 6,216,172 | B1 | 4/2001 | Koblin et al. | 709/253 |
| 6,233,532 | B1 | 5/2001 | Boudreau et al. | 702/89 |
| 6,285,964 | B1 | 9/2001 | Babel et al. | 702/121 |

FOREIGN PATENT DOCUMENTS

| | | |
|---|---|---|
| EP | 0 214 801 A1 | 3/1987 |
| EP | 0 223 300 A2 | 5/1987 |
| EP | 0 268 742 A1 | 7/1987 |
| EP | 639039 A1 | 2/1995 |
| EP | 0 167 941 A2 | 6/1995 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS 4 pages downloaded from http://www.interlinkbt.com/PRODUCT/IBT_PROD/dn/EUR-CON/euro-fwc.htm dated Sep. 15, 2000.

3 pages from TURK Cable Standards, by Turk, Inc., Minneapolis, Minnesota. (No Date).

U.S. patent application Ser. No. 09/519,781, Neslon et al., filed Mar. 7, 2000.

U.S. patent application Ser. No. 09/520,292, Davis et al., filed Mar. 7, 2000.

U.S. patent application Ser. No. 09/519,912, Nelson et al., filed Mar. 7, 2000.

U.S. patent application Ser. No. 09/672,338, Nelson et al., filed Sep. 28, 2000.

U.S. patent application Ser. No. 09/638,181, Roper et al., filed Jul. 31, 2000.

U.S. patent application Ser. No. 09/571,111, Westfield et al., filed May 15, 2000.

U.S. patent application Ser. No. 09/564,506, Nord et al., filed May 4, 2000.

U.S. patent application Ser. No. 09/667,289, Westfield et al., filed Sep. 22, 2000.

U.S. patent application Ser. No. 09/667,399, Behm et al., filed Sep. 21, 2000.
U.S. patent application Ser. No. 09/671,130, Fandrey et al., filed Sep. 27, 2000.
U.S. patent application Ser. No. 29/120,531, Fandrey et al., filed Mar. 21, 2000.
U.S. patent application Ser. No. 29/120,544, Fandrey et al., filed Mar. 21, 2000.
U.S. patent application Ser. No. 29/120,538, Fandrey et al., filed Mar. 21, 2000.
U.S. patent application Ser. No. 29/120,552, Fandrey et al., filed Mar. 21, 2000.
U.S. patent application Ser. No. 29/120,537, Fandrey et al., filed Mar. 21, 2000.
U.S. patent application Ser. No. 29/120,553, Fandrey et al., filed Mar. 21, 2000.
Product Data Sheet No.: 00813–0100–4378, "Model 751 Field Signal Indicator", by Rosemount Inc., Eden Prairie, Minnesota, (1997). No Month.
Product Data Sheet No.: 00813–0100–4731, "APEX™ Radar Gauge", by Rosemount Inc., Eden Prairie, Minnesota, (1998). No Month.
Product Data Sheet No.: 00813–0100–4640, "Model 3201 Hydrostatic Interface Unit", from the Rosemount Comprehensive Product Catalog, published 1998, by Rosemount Inc., Eden Prairie, Minnesota. No Month.
Product Data Sheet No.: 00813–0100–4003, "Model 8800A", by Rosemount Inc., Eden Prairie, Minnesota, (1998). No Month.
Product Data Sheet No.: 00813–0100–4773, "Model 8742C—Magnetic Flowmeter Transmitter with FOUNDATION™ Fieldbus", from the Rosemount Comprehensive Product Catalog, published 1998, by Rosemount Inc., Eden Prairie, Minnesota. No Month.
"Rosemount Model 8732C Magnetic Flowmeter Transmitter", by Rosemount Inc., Eden Prairie, Minnesota, (1998). No Month.
Product Data Sheet No.: 00813–0100–4263, "Model 444 Alphaline® Temperature Transmitters", by Rosemount Inc., Eden Prairie, Minnesota, (1997). No Month.
Product Data Sheet No.: 00813–0100–4769, "Model 3244MV Multivariable Temperature Transmitter with FOUNDATION™ Fieldbus", by Rosemount Inc., Eden Prairie, Minnesota, (1998). No Month.
Product Data Sheet No.: 00813–0100–4724, "Models 3144 and 3244MV Smart Temperature Transmitters", by Rosemount Inc., Eden Prairie, Minnesota, (1998). No Month.
Product Data Sheet No.: 00813–0100–4738, "Model 3095FB Multivariable™ Transmitter with Modbus™ Protocol", by Rosemount Inc., Eden Prairie, Minnesota, (1996, 1997). No Month.
Product Data Sheet No.: 00813–0100–4001, "Model 3051 Digital Pressure Transmitter for Pressure, Flow, and Level Measurement", by Rosemount Inc., Eden Prairie, Minnesota, (1998). No Month.
Product Data Sheet No.: 00813–0100–4698, "Model 2090F Sanitary Pressure Transmitter", by Rosemount Inc., Eden Prairie, Minnesota, (1998). No Month.
Product Data Sheet No.: 00813–0100–4690, "Model 2088 Economical Smart Pressure Transmitter", by Rosemount Inc., Eden Prairie, Minnesota, (1998). No Month.
Product Data Sheet No.: 00813–0100–4592, "Model 2024 Differential Pressure Transmitter", by Rosemount Inc., Eden Prairie, Minnesota, (1987–1995). No Month.
Product Data Sheet No.: 00813–0100–4360, "Model 1151 Alphaline® Pressure Transmitters", by Rosemount Inc., Eden Prairie, Minnesota, (1998). No Month.
Product Data Sheet No.: 00813–0100–4458, "Model 1135F Pressure–to–Current Converter", by Rosemount Inc., Eden Prairie, Minnesota, (1983, 1986, 1994). No Month.
"Single Chip Senses Pressure and Temperature," *Machine Design*, 64 (1992) May 21, No. 10.
Brochure: "Reduce Unaccounted–For Natural Gas with High–Accuracy Pressure Transmitters," Rosemount Inc. Measurement Division, Eden Prairie, Minnesota, ADS 3073, 5/91, pp. 1–4.
Technical Information Bulletin, "Liquid Level Transmitter Model DB40RL Sanitary Sensor deltapilot," Endress + Hauser, Greenwood, Indiana, 9/92, pp. 1–8.
"The Digitisation of Field Instruments" W. Van Der Bijl, *Journal A*, vol. 32, No. 3, 1991, pp. 62–65. No Month.
Specification Summary, "TELETRANS™ 3508–30A Smart Differential Pressure Transmitter," (undated) Bristol Babcock, Inc., Watertown, CT, 06795. No Date.
Specification Summary, "TELETRANS™ 3508–10A Smart Pressure Transmitter," (undated) Bristol Babcock, Inc., Watertown, CT, 06795.
Specification Summary, "AccuRate Advanced Gas Flow Computer, Model GFC 3308," (undated) Bristol Babcock, Inc., Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush–Mount Hydrostatic Pressure Transmitter," Jul. 1992, Rosemount Inc., Eden Prairie, MN 55344.
"Flow Measurement," *Handbook of Fluid Dynamics*, V. Streeter, Editor–in–chief published by McGraw–Hill Book Company, Inc. 1961, pp. 14–4 to 14–15. No Month.
"Precise Computerized In–Line Compressible Flow Metering," *Flow—Its Measurement and Control in Science and Industry*, vol. 1, Part 2, Edited by R. Wendt, Jr., Published by American Institute of Physics et al (undated) pp. 539–540.
"A Systems Approach," Dr. C. Ikoku, *Natural Gas Engineering*, PennWell Books, (undated) pp. 256–257.
"Methods for Volume Measurement Using Tank–Gauging Devices Can Be Error Prone," F. Berto, *The Advantages of Hydrostatic Tank Gauging Systems*, (undated) reprint from *Oil & Gas Journal*.
"Hydrostatic Tank Gauging—Technology Whose Time Has Come," J. Berto, *Rosemount Measurement Division Product Feature*, undated reprint from *INTECH*.
"Pressure Sensors Gauge Tank Level and Fluid Density," *Rosemount Measurement Division Product Feature*, undated reprint from *Prepared Foods* (Copyrighted 1991 by Gorman Publishing Company). No Month.
"Low Cost Electronic Flow Measurement System," *Tech Profile*, May 1993, Gas Research Institute, Chicago, IL.
"Development of an Integrated EFM Device for Orifice Meter Custody Transfer Applications," S.D. Nieberle et al., *American Gas Association Distribution/Transmission Conference & Exhibit*, May 19, 1993.
Advertisement, AccuRate Model 3308 Integral Smart DP/P/T Transmitter, (undated) Bristol Babcock, Inc., Watertown, CT 06795.
Advertisement, Model 3508 DP Transmitter, *Control Engineering*, Dec. 1992, Bristol Babcock, Inc., Watertown, CT 06795.

"Smart Transmitters Tear Up The Market," C. Polsonetti, *INTECH,* Jul. 1993, pp. 42–45.

"MicroLAN Design Guide", Dallas Semiconductor, Tech Brief No. 1, (undated).

"Bosch CAN Specification Version 2.0", by Robert Bosch GmbH, pp. 1–68 including pp. –1– and –2–, (Sep. 1991).

Product Data Sheet No. 00813–0100–4001, "Digital Pressure Transmitter for Pressure, Flow, and Level Measurement", by Rosemount Inc., (1998). No Month.

"Claudius Ptolemy (100?–170? AD)", *M&C News,* 7 pages, (Apr. 1994).

American National Standard , "Hydraulic Fluid Power–Solenoid Piloted Industrial Valves–Interface Dimensions for Electrical Connectors", National Fluid Power Association, Inc., 10 pages, (Aug. 1981).

3 pages from TURK Cable Standards, by Turk, Inc., Minneapolis, Minnesota. No Date.

"Notification of Transmittal of the International Search Report or the Declaration", PCT/US01/14521.

"Notification of Transmittal of the International Search Report or the Declaration" for PCT/US01/13993.

U.S. patent application Ser. No. 09/862,762, Wang, filed May 21, 2001.

U.S. patent application Ser. No. 09/867,961, Fandrey et al., filed May 30, 2001.

"Notification of Transmittal of the International Search Report or Declaration" for International Application Serial No. PCT/IS00/26561.

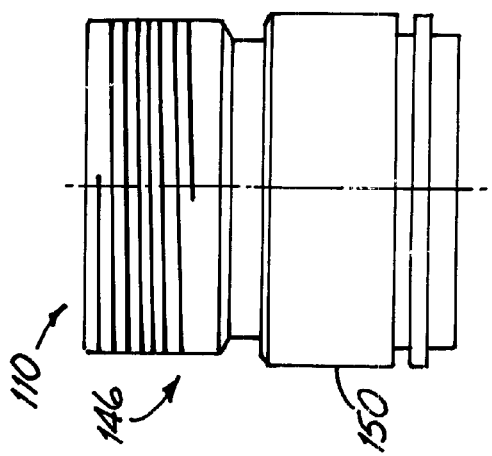
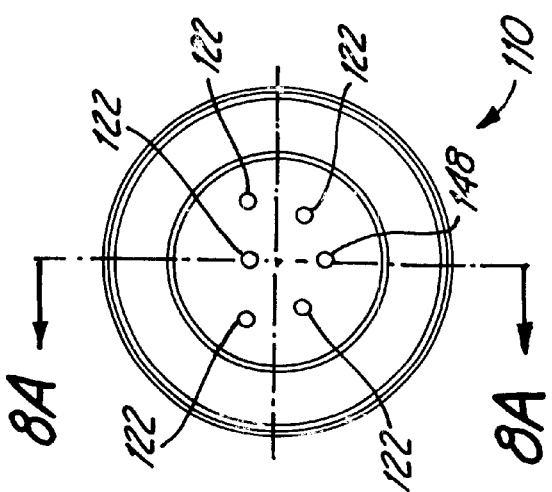
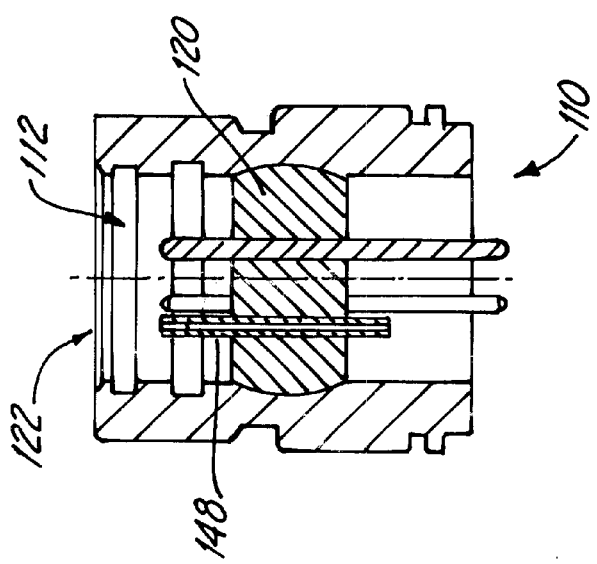

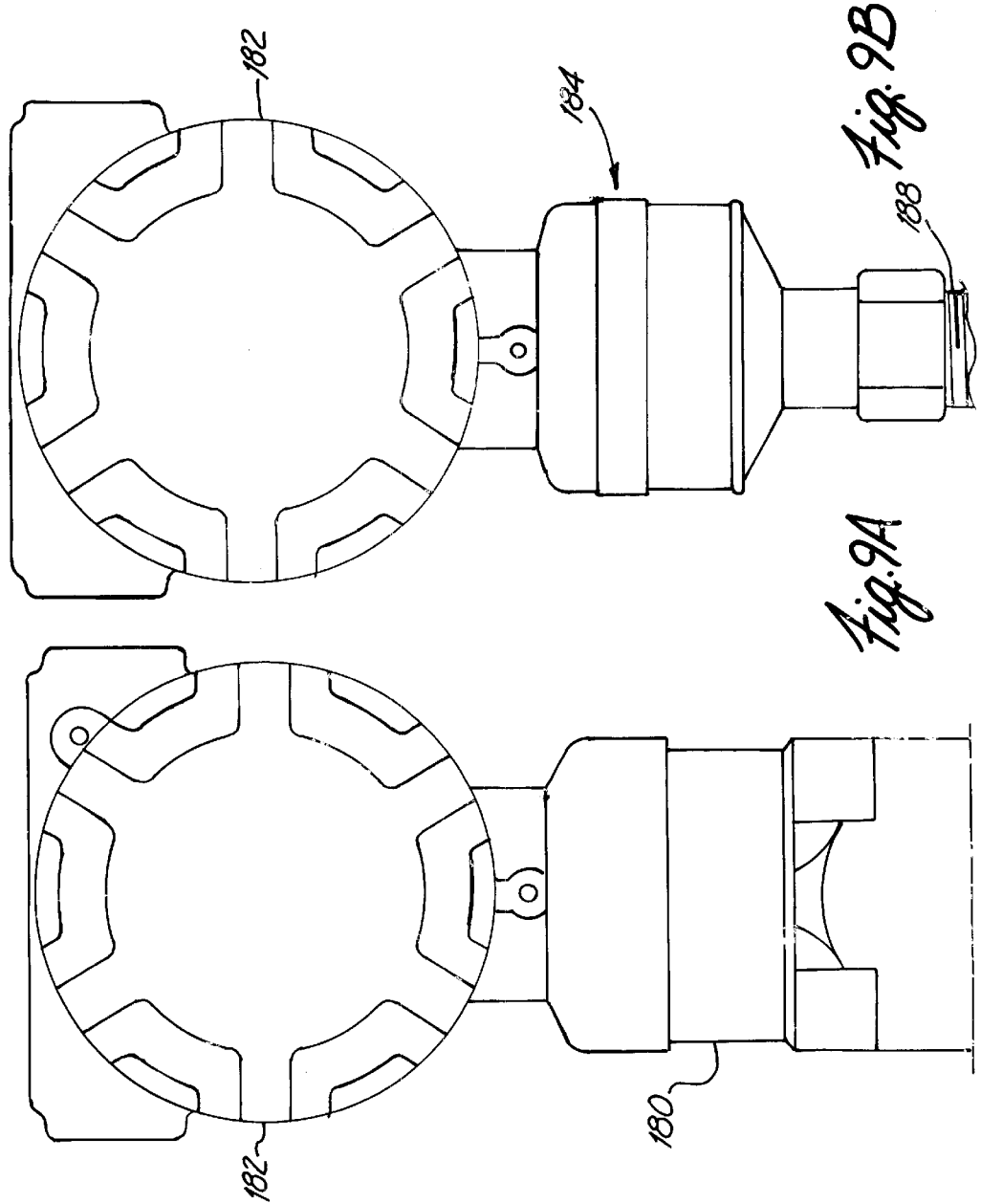

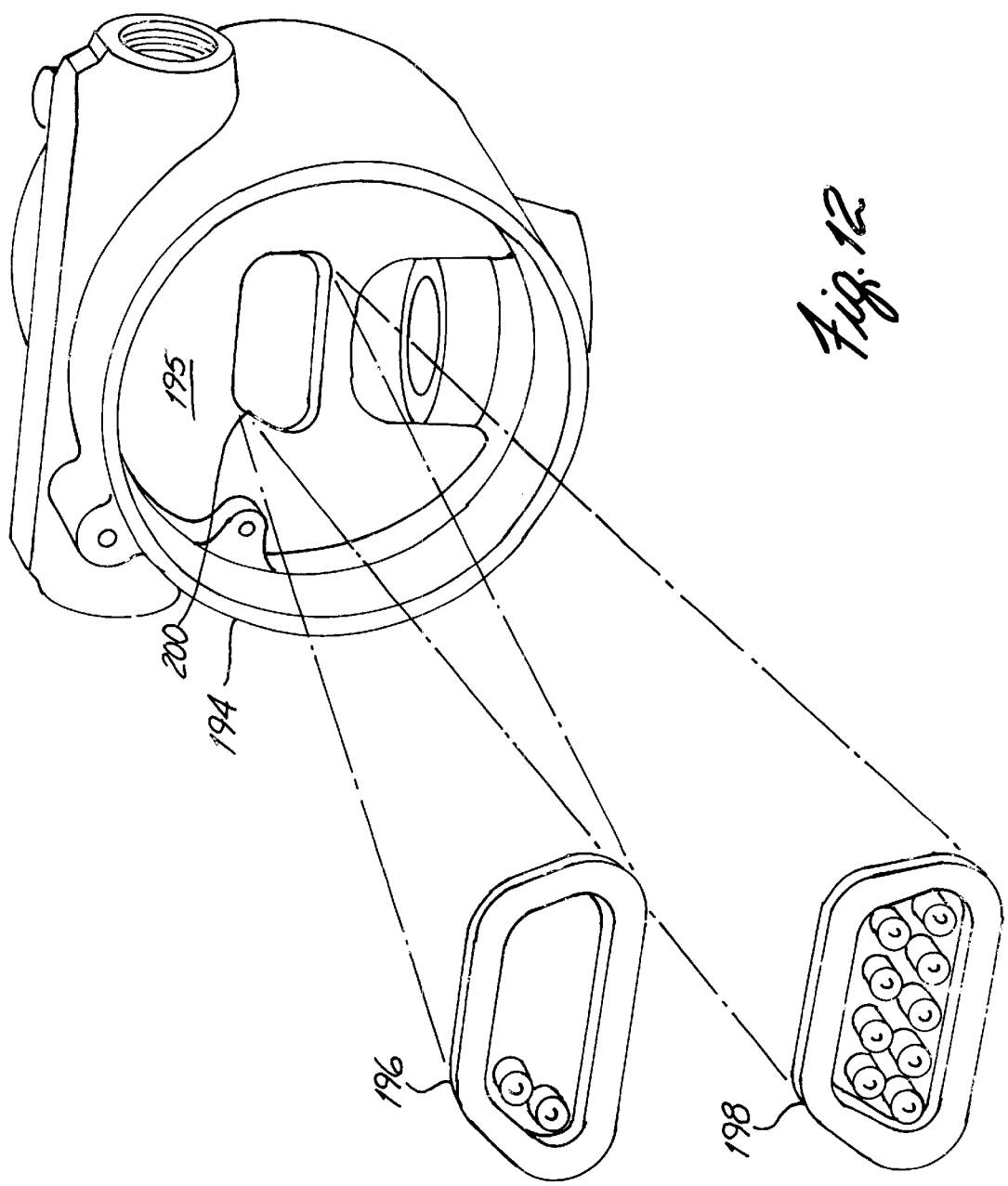

SCALABLE PROCESS TRANSMITTER

The present invention claims priority to provisional patent application Serial No. 60/156,369, filed Sep. 28, 1999, entitled "UNITIZED MODULARITY IN A PROCESS TRANSMITTER".

BACKGROUND OF THE INVENTION

The present invention relates to industrial process control equipment. More specifically, the present invention relates to measurement transmitters which are used to measure various parameters (process variables) in industrial processes.

Measurement transmitters are used in processing and manufacturing plants to measure, for example, pressure, temperature, flow, density, viscosity and many other chemical, physical and electrical properties of fluids. Transmitters typically mount on tanks, pipes and other fluid vessels, and transmit a signal representative of a fluid property to a remote location such as a control room.

Transmitters usually include a sensor housing for sensor circuitry, and a transmitter housing for transmitter circuitry. The two housings are joined together at a flameproof mechanical joint. Generally the seals, software and electrical interfaces between the sensor circuitry and transmitter circuitry are not standardized, making it impractical to combine sensor and transmitter parts from different product lines.

Typically the inside of the sensor housing is open to the inside of the transmitter housing to allow wires to pass through the threaded joint. It is not practical in a plant environment to run field wiring directly to the sensor housing without use of a transmitter housing because the sensor housing, by itself, is not sealed and flameproofed from the environment. Further, the sensor circuitry is not able to transmit over a long distance.

Within a product line of pressure transmitters, the end user will typically be able to combine parts to make different combinations of pressure range, wetted materials and electrical or display arrangement. Additionally, this joining must normally be performed by the manufacturer. It is not, however, generally practical for the user to join sensor and transmitter parts from different product lines because there are electrical, software and mechanical incompatibilities.

There is a need for a transmitter arrangement where the sensor portion can be wired directly to a control system, or to other nearby components using a local area bus to increase functionality and scalability. There is also a need for transmitter components that can also be joined with component parts from other product lines without the need for significant modifications by the end user.

SUMMARY OF THE INVENTION

A unitized sensor module is provided which, in various aspects, can be wire directly to a control system or to other nearby components. An optional scalable transmitter module can couple to the sensor module to provide increased functionality and scalability for different applications. The sensor module includes a sensor output that can be configured to connect locally to the scalable transmitter module to form a transmitter, or to be wired directly to a remote receiver. A housing for the unitized sensor module carries circuitry in a cavity and a sensor that can sense a process variable. A feedthrough seals a fitting of the housing that provides an external connection to the sensor module.

BRIEF DESCRIPTION OF THE DRAWINGS

FIGS. 8A, 8B and 8C show enlarged front, top and sectional views of an embodiment of a fitting on the unitized sensor module of FIG. 7.

FIGS. 9A and 9B show embodiments of differential and, gauge or absolute pressure transmitters.

FIG. 12 shows an exploded view of an embodiment of a dual compartment scalable transmitter module.

DETAILED DESCRIPTION OF THE PREFERRED EMBODIMENTS

The present invention provides a new sensor and transmitter module architecture for use in industrial processes. This new architecture is modular and highly scalable and can be used in a large number of configurations in contrast to typical prior art designs. With the invention, a unitized sensor module (or "super module") can be used alone to sense and measure process variables, or can be used in combination with a "feature board" carried in the optional transmitter module. The feature board can be used to add more advanced features to the super module, as desired, for a particular application or as the requirements for a particular application change over time. This modularity and scalability reduces manufacturing costs and reduces inventory requirements. Further, it provides a user with more configuration options and also reduces the number of different specific transmitter configurations which must be purchased by a user. The sensor module and transmitter module preferably meet intrinsic safety standards while still maintaining the ability to be scaled without removal of the module(s) from the "field".

Figure 1:
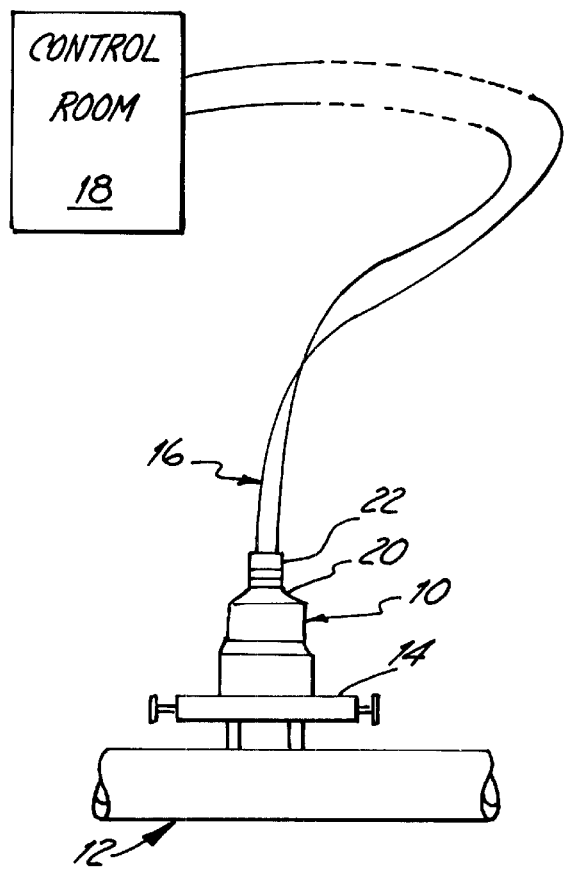
FIG. 1 shows a unitized sensor module in accordance with one aspect of the invention coupled to process piping.

FIG. 1 is a simplified diagram showing a unitized sensor module 10 coupled to an industrial process 12 (illustrated as a process pipe) which may contain a process "fluid" such as a liquid or a gas. The unitized sensor module 10 couples to process 12 through a manifold 14 and is configured to sense a process variable of the process. Examples of process variables includes pressure, temperature, flow, level, pH, conductivity, turbidity, density, concentration, chemical composition, or other properties of the process fluid. The unitized sensor module 10 can include one or more process variable sensors and includes an output connection or fitting 22 which can be configured to communicate in accordance with more than one communication standard.

In the embodiment shown in FIG. 1, the output from sensor module 10 couples to a two-wire process control loop 16 which can be in accordance with known two-wire control loop standards such as a 4–20 mA loop, a loop that operates in accordance with the HART protocol, loops that communicate in accordance with fieldbus, profibus or other protocols, etc. Loop 16 couples to a remote location such as control room 18. Control room 18 includes a power supply (not shown) such that module 10 can be completely powered from the same loop 16 over which it communicates. In general, sensor module 10 includes a single main exterior housing 20 having a process connection adapted to couple to process 12 and an output connection or fitting 22 which is configured to provide more than one different type of output for coupling to different types of devices or databuses.

Figure 2:
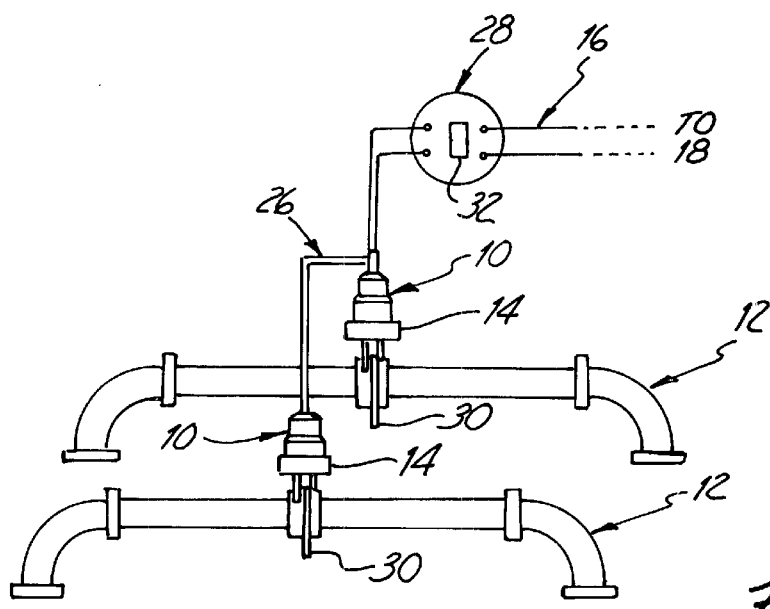
FIG. 2 shows two unitized sensor modules coupled to a transmitter module on a local area bus.

FIG. 2 shows another example configuration of the architecture of the present invention. In FIG. 2, two unitized sensor modules 10 couple to a local area bus 26 which provides communication with a scalable transmitter module 28 which includes a "feature board". Typically, bus 26 is a serial bus, for example, in accordance with the Controller Area Network (CAN) protocol. The transmitter module 28 can perform additional processing based upon measurements from the two sensor modules 10 or otherwise provide communication over process control loop 16. For example, sensor modules 10 can be configured to provide redundant measurements or can be configured to provide multiple measurements such that transmitter module 28 can calculate more advanced process parameters such as flow rate or liquid level. In the specific configuration, the two sensor modules are shown as measuring a differential pressure across orifice plates 30. However, the sensor modules 10 can measure any type of process variable. In another example, shown in FIG. 7, the sensor module 10 mounts directly to the transmitter module, which itself, can connect to additional sensor modules.

The configuration of the unitized sensor module 10 and transmitter module 28 illustrated in FIGS. 1 and 2 provides a highly scalable architecture. A user can configure a single sensor module 10 for simple installations in which a process variable is sensed. However, for more advanced configurations, a transmitter module 28 can be added to provide more advanced capabilities (i.e., "features"). For example, module 28 can perform advanced diagnostics or convert data to other configurations for transmission on any type of control loop or databus 16. Transmitter module 28 can collect data from multiple sources for redundancy or to provide more advanced process variables such as flow rate which can be calculated using a number of different process variables. Another example is liquid level in which process variables are collected from multiple locations on a process tank. Transmitter module 28 can also include a visual output 32, such as an LCD, in which data or process variables are visually provided and can be inspected by an operator.

In one configuration, bus 26 also provides power to modules 10. In some embodiments, transmitter module 28 is itself powered from loop 16 such that no extra power connections are required for transmitter 28 and modules 10. Bus 26 can also be used for simple on/off (open/close) communication or control. In embodiments where transmitter module 28 is directly coupled to sensor module 10, bus 26 is used to provide an internal databus.

Preferably module 10 is configured in accordance with intrinsic safety standards such that it can be used in a hazardous explosive environment. A simple transmitter module 28 configuration is one in which the module 28 simply provides a termination compartment to house a terminal block (see FIG. 3C) for loop 16 wiring and bus 26 wiring. With more advanced configurations, transmitter module 28 can include multiple compartments for housing wiring terminator blocks and circuit boards. Some of the functionality of transmitter module 28 is provided in software which can be selected and/or loaded into module 28 based upon a particular application. This reduces the number of different hardware options which must be provided and various configurations can be obtained simply by choosing and loading the appropriate software into module 28.

Figure 3D:
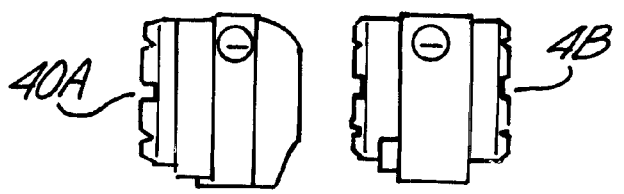
FIGS. 3A, 3B, 3C and 3D show examples of unitized sensor modules, circuit boards, terminal blocks and transmitter module housings, respectively.
Figure 3C:
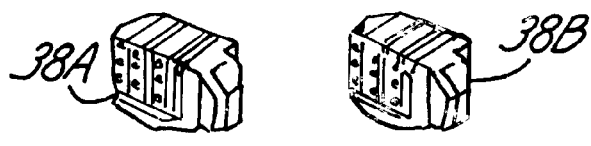
Figure 3B:
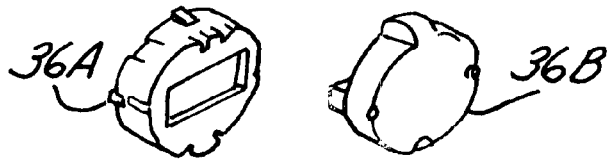
Figure 3A:
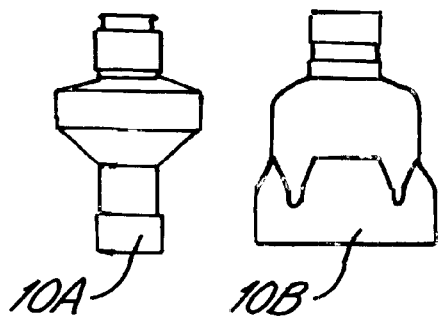

FIGS. 3A–3D show various modules which can be utilized with the scalable architecture of the present invention. For example, FIG. 3A shows unitized sensor modules 10A and 10B. An appropriate sensor module can be selected based upon a particular implementation. For example, the sensor module should be selected so that it is configured for the appropriate process connections, process variable measurement, process variable ranges, material selection, etc. FIG. 3B illustrates example circuit board (i.e., feature board) options 36A and 36B. Boards 36A and 36B are typically part of transmitter module 28. For example, option board 36A can provide a visual display or option board 36B can provide a particular data output format or process variable compensation. FIG. 3C illustrates terminal block options 38A and 38B. Terminal blocks 38A and 38B can provide, for example, a different number of terminations, various types of transient protection, hardware switches, etc. as desired for a particular application. Typically, terminal blocks 38A and 38B are part of transmitter module 28. FIG. 3D shows housing options 40A and 40B for transmitter module 28 that can be selected for a particular implementation. For example, housing options 40A and 40B can be selected based upon requirements for single or dual compartment housing, various different housing materials as required, different diameter or sizes as required, etc. Housings 40A and 40B provide the housing for transmitter module 28.

Figure 3E:
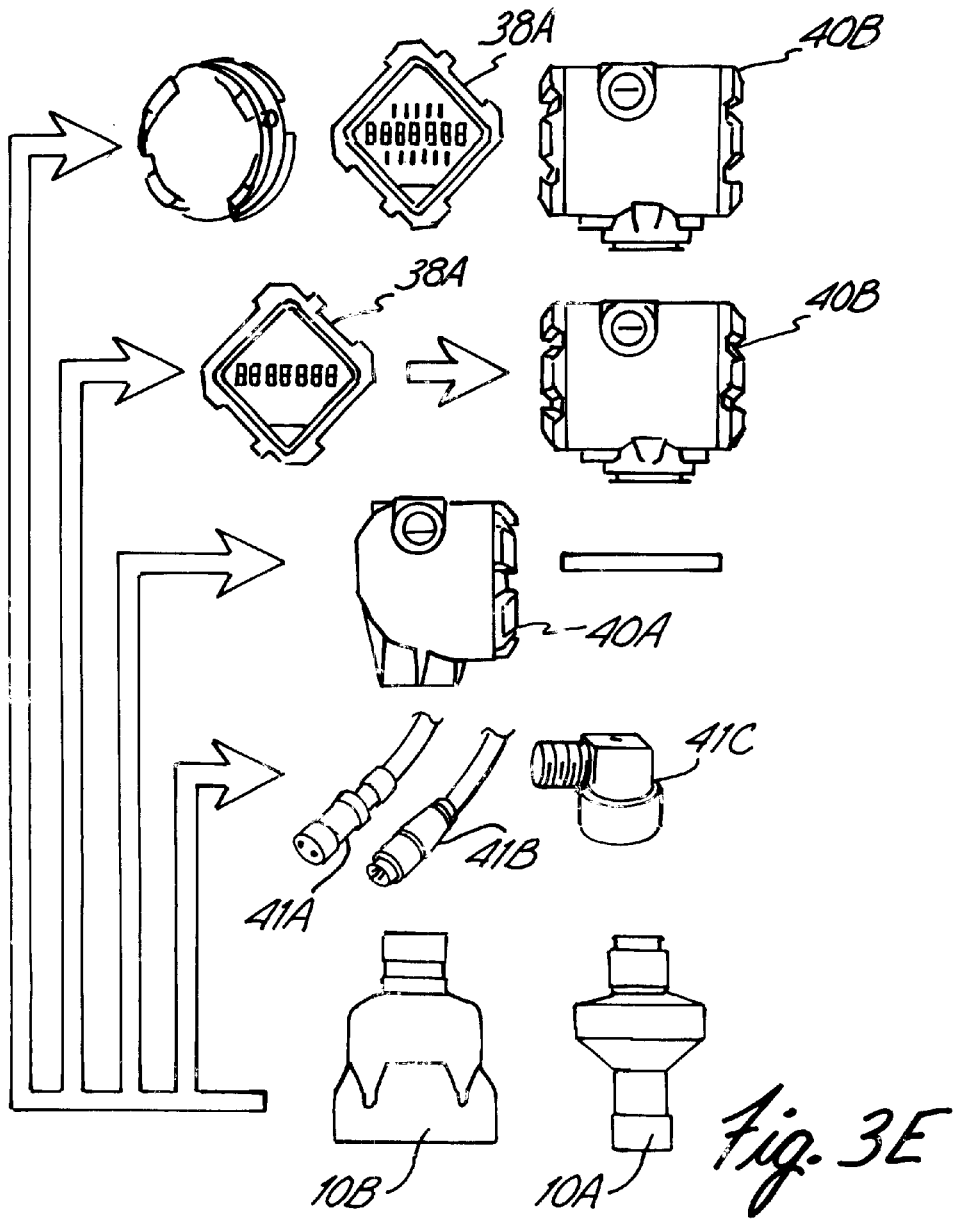
FIG. 3E shows various combinations for sensor modules circuit boards, housing and connectors.

FIG. 3E also illustrates the scalability of the invention. Sensor modules 10A and 10B can be used with various combinations of option boards 36A and housings 40A and 40B. Quick connectors 41A, 41B and 41C can be used to couple directly to modules 10A and 10B. This scalability allows a user to add features or change configurations as desired.

In addition to the advantages discussed above, the scalability of the invention allows a common feature board to be used with a family of sensor modules. Each sensor module in the family can provide differing performance levels, be designed for different types of process fluids or environments, and/or provide differing hardware/software capabilities. A common feature board can also be used with new sensor module designs or sensor modules configured to sense new process variables. New feature boards can be added to existing sensor modules to provide new capabilities such as a new communication protocol or diagnostic function. As another example, a new feature board potentially having new capabilities, can be added to function with multiple sensor module in a unique architecture.

Figure 4:
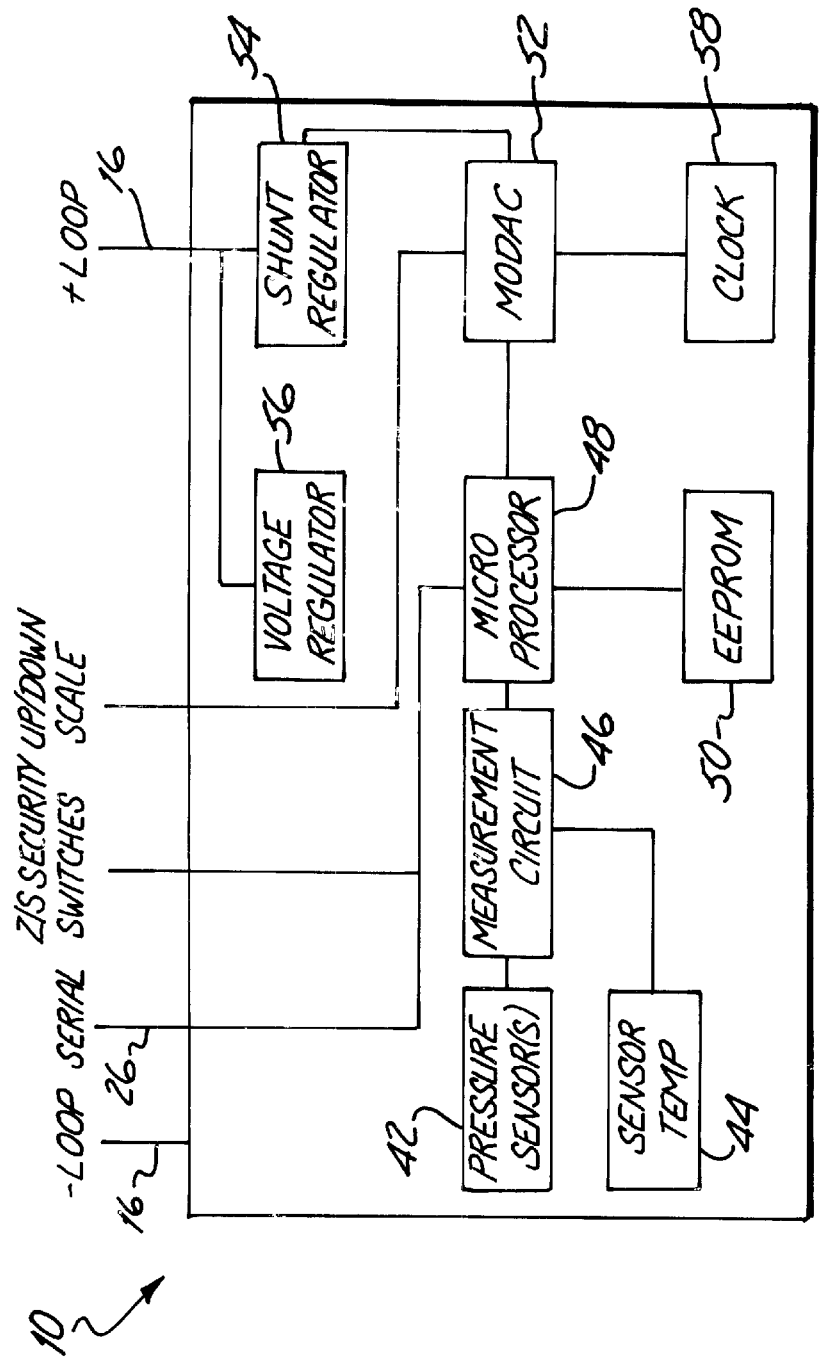
FIG. 4 is a simplified block diagram of a unitized sensor module in accordance with one embodiment.

FIG. 4 is a simplified block diagram showing components of unitized sensor module 10 in accordance with one specific embodiment. Module 10 typically includes some type of sensor element such as pressure sensor(s) 42. Measurement circuitry 46 provides a measurement signal to microprocessor 48 based upon the pressure sensor 42 measurement which is compensated based upon the temperature measured by temperature sensor 44. Microprocessor 48 couples to local area bus 26 which is shown as a serial databus. Microprocessor 48 operates in accordance with instruction carried in a non-volatile memory such as EEPROM 50 which can also be a read only memory (ROM). Zero-span and/or security switches are provided to configure the zero and span of the module 10. These can be open/close switches which couple to fitting 22 shown in FIG. 1. Microprocessor 48 also provides an output to MODAC 52 which can be used when module 10 is configured to transmit data on two-wire process control loop 16. (MODAC refers to an ASIC which includes a modem and a digital to analog converter. Of course, other configurations can also be used with the invention.) The circuitry can be configured to control the current through loop 16 using shunt regulator 54 or to digitally transmit data onto loop 16. A voltage regulator 56 couples to loop 16 or to transmitter module 28 and is used to provide a regulated voltage to circuits within unit 10. MODAC 52 also has an optional up/down scale input which is used to scale the output signal. A clock 58 controls operation of MODAC 52 and, for example, microprocessor 48. In the embodiment shown in FIG. 4, a total of five input/output terminals are provided and can be configured for different types of communication protocols. However, any number of input/output terminals can be used.

Figure 5:
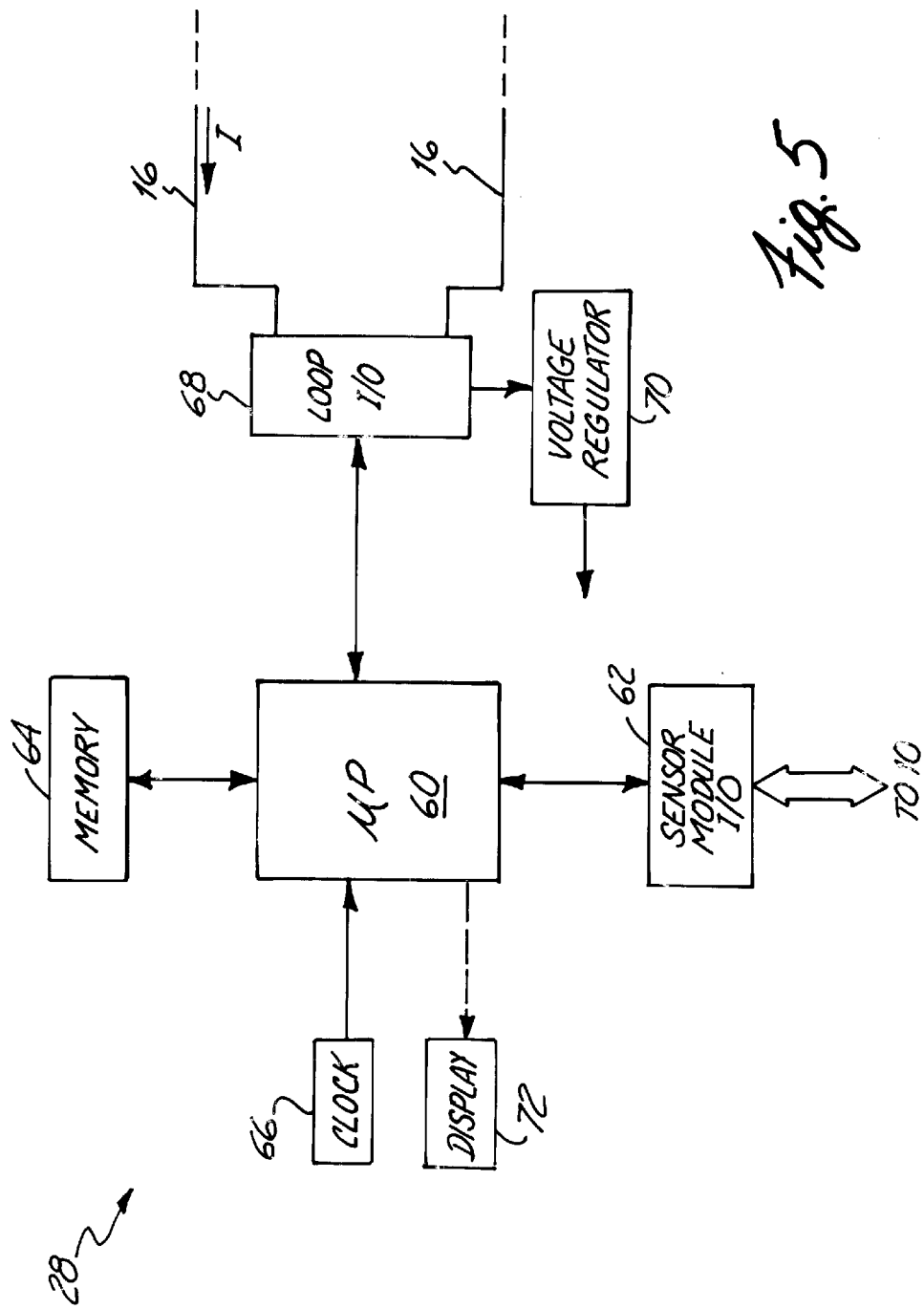
FIG. 5 is a simplified block diagram of a transmitter module in accordance with one embodiment.

FIG. 5 is a simplified block diagram of transmitter module 28. A microprocessor 60 in module 28 couples to sensor module 10 through sensor module I/O 62. Sensor module I/O 62 provides a connection and interface to some or all of the connections illustrated in FIG. 4. For example, in addition to providing a serial communication link over bus 26, power can be provided to sensor module 10 over the process control loop 16 connection. Microprocessor 60 operates in accordance with instructions stored in memory G4 at a rate determined by clock 66. Data is sent and received over process control loop 16 using loop input/output circuitry 68. A voltage regulator 70 can be provided as a power source to circuitry within transmitter module 28. This power can be completely derived from power received over loop 16.

Memory 64 can be programmed during manufacture or during subsequent use to provide different features and operate with various types of sensor modules 10 and sensors carried in such modules. Typically, memory 64 includes non-volatile memory which can permanently store programming instructions and data. Various features are required or as the architecture and configuration is changed, the instructions for microprocessor 60 can be updated in memory 64. Transmitter module 28 can be configured to provide a fairly standardized platform with various features Implemented in the programming instructions for microprocessor 60. Of course, various hardware options are also available such as a local display 72 or specialized input/output circuitry 68. However, in one example, input/output 68 can be configured to operate in accordance with a number of well known standards such as a 4–20 mA standard, the HART communication protocol, the fieldbus protocol, etc. Microprocessor 60 controls I/O 68 to use the appropriate protocol as programmed in instructions stored in memory 64.

FIGS. 6–13 provide a more detailed description for some specific implementations of the architecture of the present invention.

Figure 6:
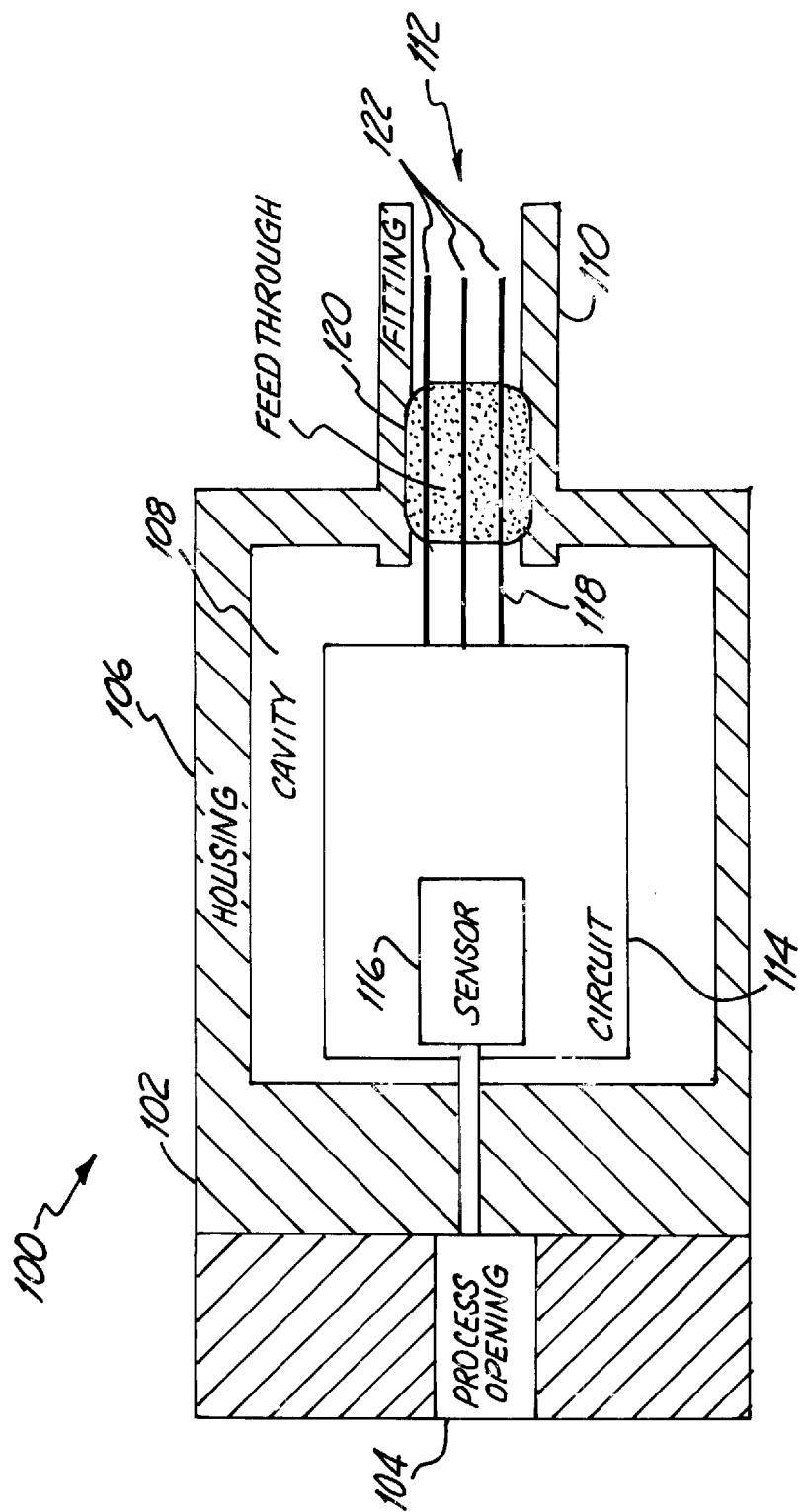
FIG. 6 shows a simplified diagram of an embodiment of a unitized sensor module.

FIG. 6 shows a block diagram of one embodiment of a unitized sensor module 100 which is one specific implementation of module 10 in FIG. 1. Unitized sensor module 100 includes a housing 102 that supports the unitized sensor module 100 in cavity 108 and provides a process opening 104 for coupling to a process fluid. The process opening 104 can be a flange, pipe, etc. Housing 102 has a fitting 110 that can support a scalable transmitter module such as module 28 in FIG. 2. Fitting 110 can be formed with or welded to the outer wall 106 so that no seals are needed at the point between the fitting 110 and the outer wall 106. The fitting 110 has an opening 112 that extends into the cavity 108.

A sensor module circuit 114 in the cavity 108 includes a sensor 116 that couples to the process opening 104. Circuit 114 can, for example, provide the components shown in FIG. 4. The circuit 114 generates a sensor output 118 representative of a process variable.

A feedthrough 120 in the opening 112 of fitting 110 seals the fitting 110 such that cavity 108 is flameproof. Unitized sensor module 100 is completely sealed and suitable for use in the field as a stand alone unit and does not require the installation of a transmitter module. The feedthrough 120 has external conductors 122 that energize the circuit 114, provide the sensor output 118, and receive configuration commands.

The sensor output 118 is configurable for local connection to scalable transmitter module 28 (FIG. 2) and also configurable for direct wiring to a remote receiver such as control room 18 (FIG. 1). Output 118 can be more than one connector. For example, one connector or set of connectors can be for the local connection and one connector or set of connectors can be for the remote connection. A digital configuration signal can be sent to circuit 114 to configure the sensor output. In the specific arrangement shown, the output 118 is configurable to provide a signal that is transmittable over long distances to a remote receiver such as a HART signal, a 4–20 mA analog signal, a Foundation Fieldbus signal and the like. The output 118 can be configured to provide a signal for local use, such as a CAN protocol signal to a scalable transmitter module 28 or other local unit. This is shown schematically by a switch in the circuit 114 which can be controlled by configuration commands provided to microprocessor 48 to select an output type.

Figure 7:
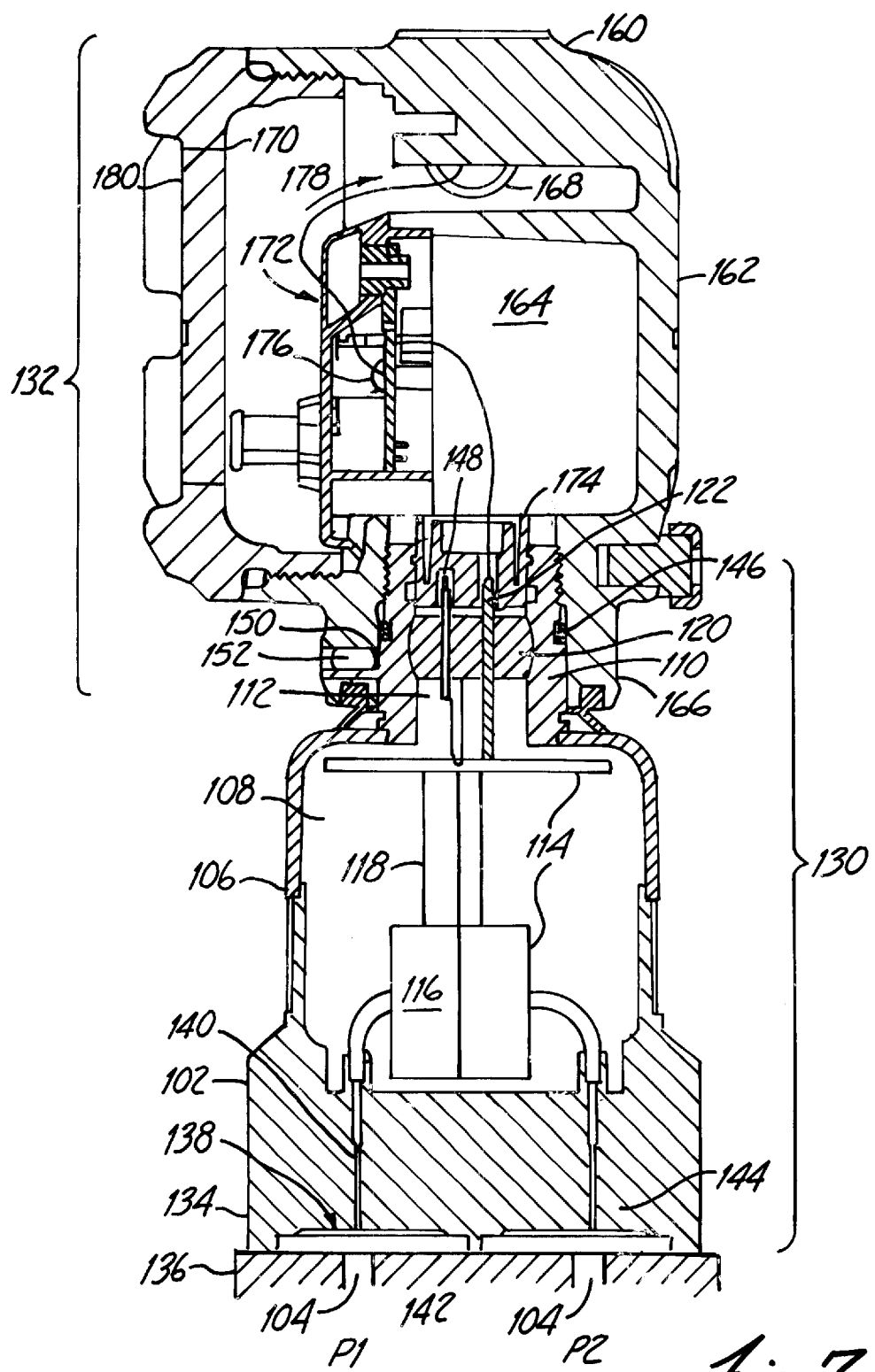
FIG. 7 shows a cross sectional view of an embodiment of a modular differential pressure transmitter which includes a transmitter module and a sensor module.

FIG. 7 shows a cross sectional view of a sensor module 130 directly mounted to scalable transmitter module 132. Module 132 is a specific implementation of module 28 shown in FIG. 5. In this example, sensor module 130 senses differential pressure (P1–P2) at a coplanar mounting flange 134. The coplanar mounting flange is bolted to a mating coplanar inlet flange 136 with two process openings 104. An isolator 138 isolates process fluid from the sensor 116. Isolator 138 includes a passageway 140 which couples the sensor 116 to the process opening, the passageway having a shape which provides flameproofing. The isolator 138 also includes an isolator diaphragm 142 and is filled with an incompressible fluid such as silicone oil. Isolator 144 is similar to isolator 138.

Fitting 110 includes an outer surface 146 to seal to transmitter module 132. A capillary tube 148 that is sealed to complete flame-proofing of the feedthrough. Capillary tube 148 is open during manufacture and is used during manufacture to test the quality of the seal of cavity 108 and can also be used to evacuate the cavity and fill it with a noncorrosive gas such as dry air or a nonflammable gas such as dry nitrogen. After testing or filling, capillary tube 148 is sealed by welding or glassing. Capillary tube 148 can also be used as a feedthrough conductor or a grounding conductor. The outer surface 146 of the fitting 110 includes a set screw surface 150 which permits rotation of at least 360 degrees of a setscrew 152. The fitting 110 extends around the external conductors 122 and is notched to retain a plug from either field wiring or a scalable transmitter module that mates with the external conductors. The housing is formed of at least 2 millimeter thick metal and is flame and explosion proof.

FIG. 7 also shows a scalable transmitter module 132 which includes a housing 160 to mount on the sensor module 130. The housing has an outer wall 162 surrounding a cavity 164 and has a first hub 166 to mount to fitting 110 of the sensor module 130. Housing 160 also has a second hub 168 for connection to a wiring raceway to a remote receiver. Hubs 166, 168 open to the cavity 164 and the cavity has a removable cover 170. Typically, there are two hubs 168 on either side of housing 160, however, any number of hubs 168 can be used. Housing 160 can have two (or more) separate, isolated cavities. Cover 170 is threaded to provide a flameproof seal to the housing. A circuit 172 in the cavity 164 is wired to a plug 174 that mates with the feedthrough 120 of the unitized sensor module. The circuit 172 can receive a sensor output from the sensor module and generate a scalable output 178 on circuit terminal block 176, which is accessible by removing the cover 170.

Fitting 110 is shown in more detail in FIGS. 8A, 8B and 8C. Feedthrough 120 includes glass insulator that protrudes slightly to fix its position in fitting 110. The fitting 110 is threaded as shown and includes a groove for an O-ring.

Figure 10:
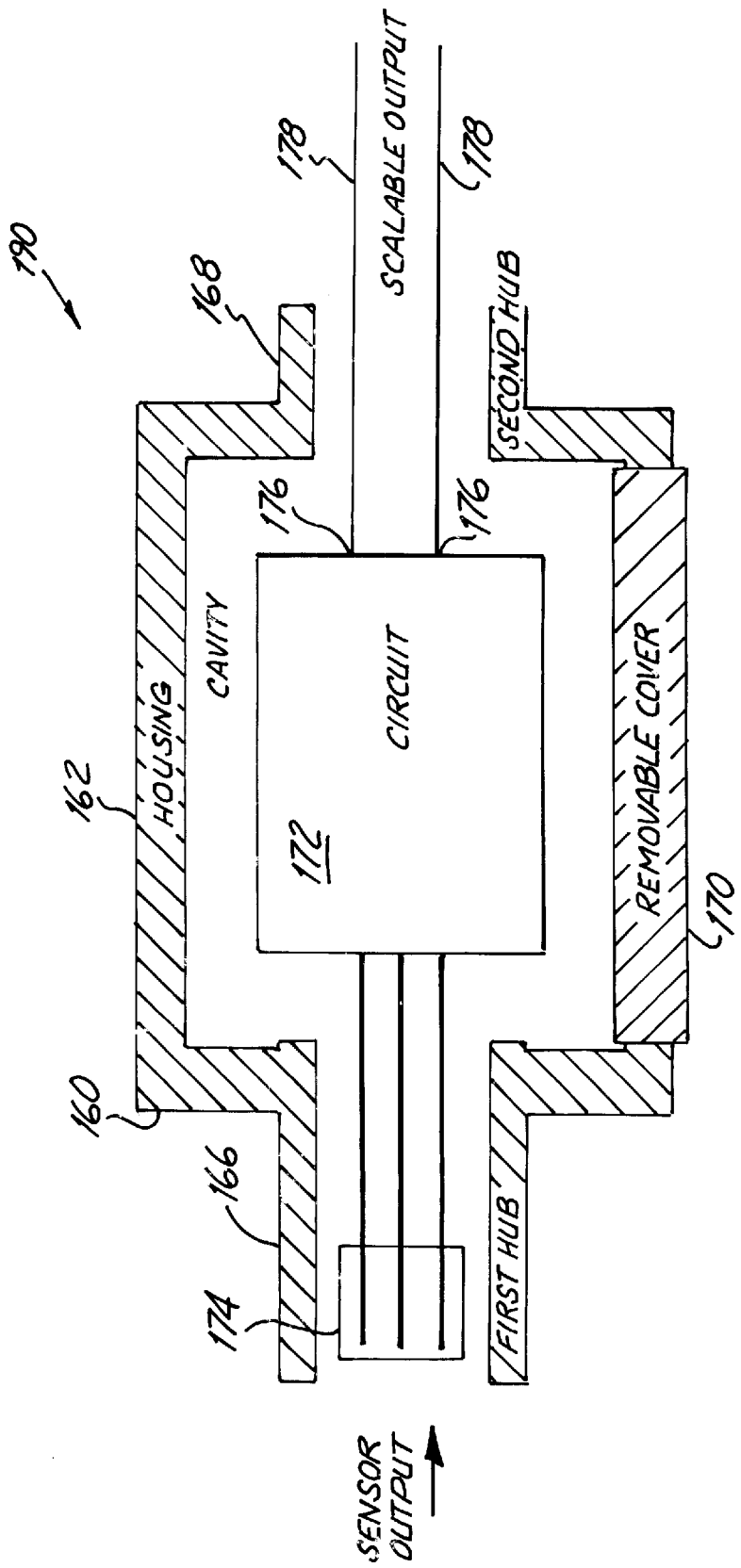
FIG. 10 shows a simplified diagram of an embodiment of a scalable transmitter module.

FIG. 9A shows a differential pressure sensing unitized sensor module 180 with a scalable transmitter module 182 joined to it. FIG. 9B shows an absolute or gauge pressure sensing unitized sensor module 184. Sensor module 184 has an internally threaded fitting for connection to a threaded pipe. The same scalable transmitter module 182 can be used on a line of differential pressure transmitters and also on a line of gauge or absolute pressure transmitters as shown, FIG. 10 shows a simplified physical diagram of a scalable transmitter module 190. Numbers used in FIG. 10 that are the same as reference numbers used in FIG. 7 identify similar features.

Figure 11A:
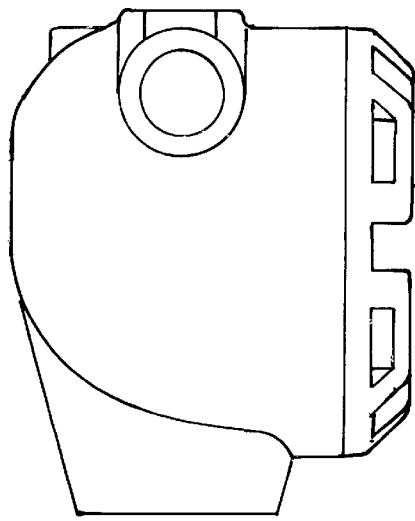
FIGS. 11A, 11B, 11C and 11D show front and side views of embodiments of single and dual compartment housings for scalable transmitter modules.
Figure 11B:
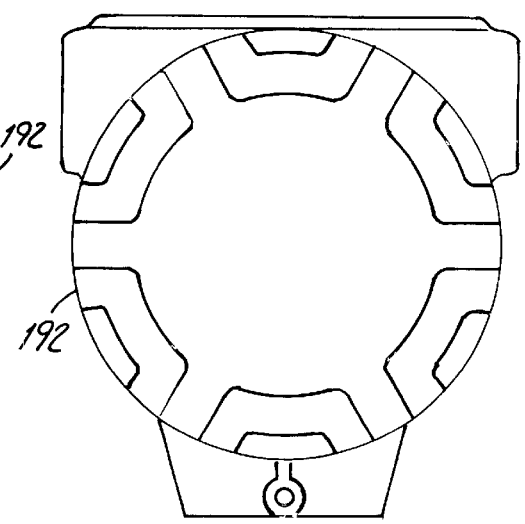
Figure 11C:
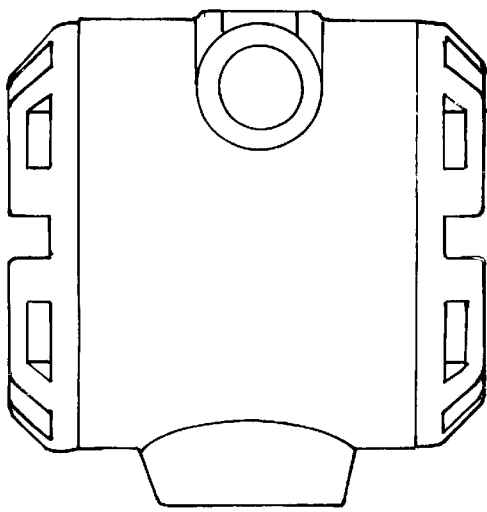
Figure 11D:
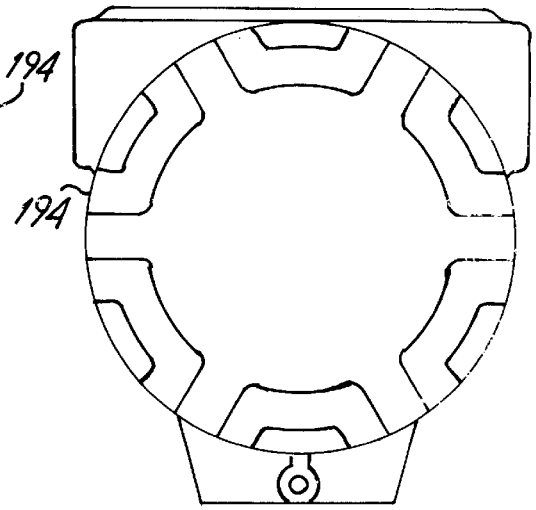

In FIGS. 11A–11D, front and side views of housings for scalable transmitters are shown. Front and side views of a single compartment housing 192 are shown in FIGS. 11B and 11A, respectively. Front and side views of a dual compartment housing 194 are shown in FIGS. 11D and 11C, respectively. The scalable transmitter module can be scaled in terms of the number of compartments in the housing by selecting in housing 194 is divided by a divider wall 195 joined a housing 192, 194 for a particular application.

FIG. 12 is an exploded view of a dual compartment housing 194 with covers removed. The cavity to the housing between the first and second hubs, and the terminal block is mounted and sealed in the divider wall 195. Housing 194 can be scaled further by selecting a terminal block, for example, a simple two terminal block 196 or a terminal block 198 with more than two terminals, depending on the application. The terminal block chosen fits into and seals an opening 200 between the two compartments.

Figure 13A:
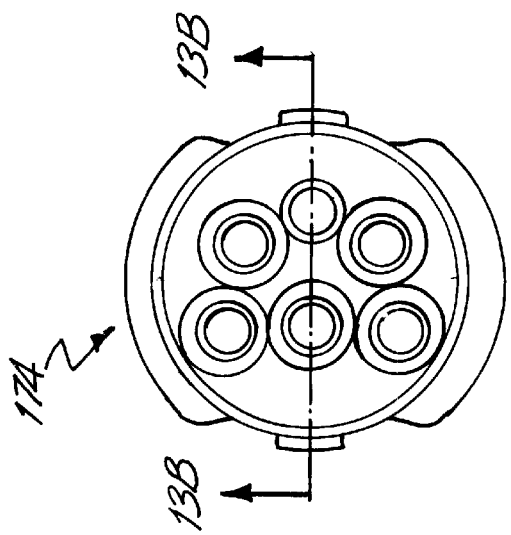
FIGS. 13A and 13B show top and sectional views of an embodiment of a plug for a scalable transmitter module.
Figure 13B:
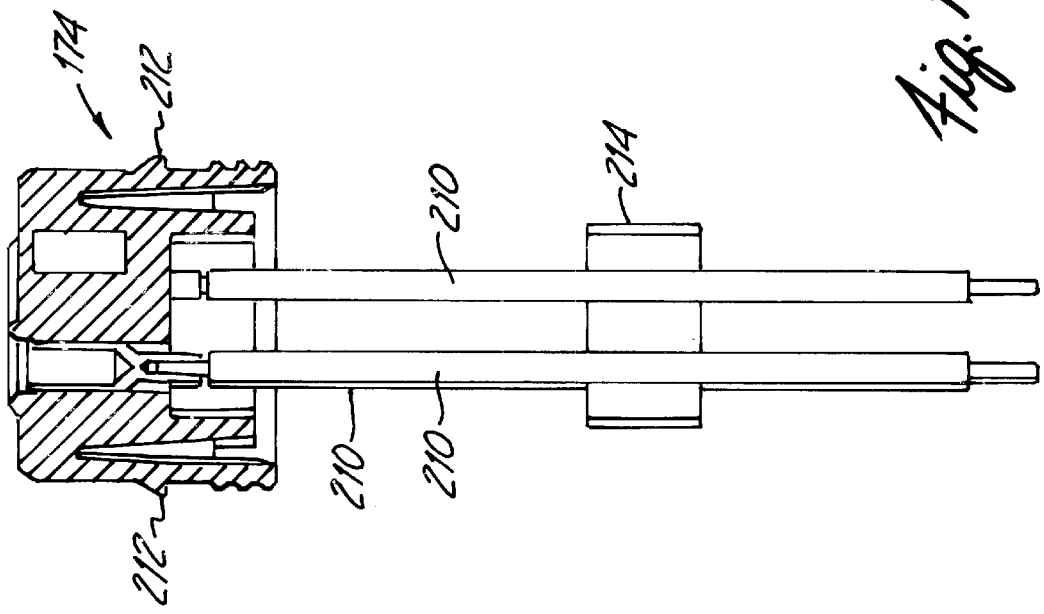

FIGS. 13A and 13B show plug 174 in more detail. Plug 174 includes multiple conductors 210, of which three are illustrated. Plug 174 includes spring loaded projections 212 which snap into a groove on fitting 110 to secure the plug 174 in the fitting 110. Shrink tubing 214 can be placed over the conductors 210 and shrunk to form a cable and provide increased abrasion resistance.

The architecture of the invention provides a sealed unitized sensor module that can be configured to provide a basic output wired directly to a control system. When more specialized types of transmitter outputs or visual displays are desired, the unitized sensor module can be configured to provide a local output that supports a scalable transmitter module. A scalable transmitter module can be added in the field and provided with circuitry that is scaled to meet the needs of the application.

In one embodiment, a flameproof joint, a seal and electrical connections are all combined into a single header that is integral with the housing of the unitized sensor module. The header is standardized to allow direct connection to a control system or mounting of a scalable transmitter module on the header. Electrical, mechanical and software interfaces are standardized at the header to allow the same group of scalable transmitter modules to be used with different lines of unitized sensor modules.

Although the present invention has been described with reference to preferred embodiments, workers skilled in the art will recognize that changes may be made in form and detail without departing from the spirit and scope of the invention. For example, other physical or electrical architectures can be used to achieve the scalability of the present invention. In one aspect, the invention is not limited to the specific illustrations set forth herein. The sensor module can include any type of sensor used to sense a process variable, for example, pressure, flow, temperature, or level sensors based upon any type of sensing technology. Preferably, all couplings to the modules and the modules themselves, meet intrinsic safety requirements while maintaining their modularity.

What is claimed is:

1. A unitized sensor module, comprising:
a housing adapted to support the unitized sensor module on a process opening, the housing having an outer wall surrounding a cavity and having a fitting integral with the outer wall and adapted to support a scalable transmitter module, the fitting opening to the cavity;
a circuit in the cavity, the circuit having a sensor coupling to the process opening and providing a sensor output; and
a feedthrough sealing the fitting and having external conductors energizing the circuit and providing the sensor output, the sensor output being configurable for local connection to a scalable transmitter module and configurable for direct wiring to a remote receiver.

2. The unitized sensor module of claim 1 further comprising an isolator configured to isolate fluid at the process opening from the sensor.

3. The unitized sensor module of claim 2 wherein the isolator includes a passageway to couple between the sensor and the process opening, the passageway having a shape which provides flameproofing.

4. The unitized sensor module of claim 1 wherein the fitting includes an outer surface adapted to seal to a scalable transmitter module.

5. The unitized sensor module of claim 1 wherein the feedthrough includes a capillary tube sealed to complete flame-proofing of the feedthrough.

6. The unitized sensor module of claim 1 wherein the cavity is filled with a non flammable gas.

7. The unitized sensor module of claim 1 wherein the outer surface of the fitting further comprises a setscrew surface adapted to permit rotation of at least 360 degrees of a setscrew on a scalable transmitter module.

8. The unitized sensor module of claim 1 wherein the fitting extends around the external conductors and is adapted to retain a plug mating with the external conductors.

9. The unitized sensor module of claim 1 wherein the housing is formed of metal and has a wall thickness of at least 2 millimeters thick and the housing is explosion proof.

10. The unitized sensor module of claim 1 wherein the housing includes a flange which couples to the process opening and also couples to a second process opening for sensing differential pressure.

11. The unitized sensor module of claim 1 wherein the local connection comprises a serial bus.

12. The unitized sensor module of claim 1 wherein the local connection comprises between three and five conductors.

13. The unitized sensor module of claim 1 wherein the circuit is configured to be powered from the local connection.

14. The unitized sensor module of claim 1 wherein the direct wiring comprises a two wire process control loop.

15. The unitized sensor module of claim 14 wherein the loop is in accordance with a 4–20 mA standard.

16. The unitized sensor module of claim 14 wherein the loop is in accordance with a digital communication standard.

17. The unitized sensor module of claim 1 wherein the module is intrinsically safe.

18. A transmitter comprising a scalable transmitter module coupled to the unitized sensor module of claim 1.

19. The transmitter of claim 18 including a feature board configured to process the sensor output from the circuit of the unitized sensor module.

20. The transmitter of claim 18 including a second unitized sensor module coupled to the scalable transmitter module.

21. The transmitter of claim 18 wherein the scalable transmitter module is spaced apart from the unitized sensor module and the units are electrically coupled together.

22. The transmitter of claim 18 wherein the transmitter module is physically coupled to the feedthrough of the unitized sensor module.

23. The transmitter of claim 19 wherein the feature board includes a display.

24. The transmitter of claim 19 wherein the feature board is configured to provide an output related to the sensor output on a two wire process control loop.

25. The transmitter of claim 24 wherein the two wire process control loop is in accordance with a 4–20 mA standard.

26. The transmitter of claim 24 wherein the two wire process control loop is in accordance with a digital standard.

27. The transmitter of claim 24 wherein the scalable transmitter module and the unitized sensor module are completely powered from the two wire process control loop.

28. The transmitter of claim 18 wherein the unitized sensor module is completely powered with power received from the modular transmitter module through feedthrough.

29. The transmitter of claim 18 wherein the transmitter is intrinsically safe.

30. A scalable transmitter module, comprising:
a housing adapted to mount on a unitized sensor module, the housing having an outer wall surrounding a cavity and having a first opening adapted to mount on a fitting of the unitized sensor module and a second opening adapted for connection to a wiring raceway to a remote receiver, the first and second openings to the cavity, and the cavity having a removable cover; and
a circuit in the cavity having a plug adapted to mate with a feedthrough of the unitized sensor module, the circuit being adapted to receive a sensor output from the unitized sensor module and generate a scalable output on circuit terminals accessible by removing the cover, the scalable output being adapted for connection to the remote receiver.

31. The scalable transmitter module of claim 30 wherein the circuit includes a terminal block connecting the sensor output to the remote receiver.

32. The scalable transmitter module of claim 30 wherein the circuit is configured to transmit the sensor output on a two wire process control loop adapted for transmission to the remote receiver.

33. The scalable transmitter module of claim 30 wherein the removable cover includes a window and the circuit includes a display visible through the window.

34. The scalable transmitter module of claim 30 wherein the cavity is divided by a divider wall joined to the housing between the first and second openings, and the terminal block is sealingly mounted in the divider wall.

35. The scalable transmitter module of claim 30 wherein the circuit board is configured to process a sensor output from the unitized sensor module.

36. The scalable transmitter module of claim 30 wherein the circuit board is configured to couple to a second unitized sensor module.

37. The scalable transmitter module of claim 30 wherein the transmitter module is configured to be spaced apart from the unitized sensor module and the units are electrically coupled together.

38. The scalable transmitter module of claim 32 wherein the transmitter module is physically coupled to the feedthrough of the unitized sensor module.

39. The scalable transmitter module of claim 32 wherein the two wire process control loop is in accordance with a 4–20 mA standard.

40. The scalable transmitter module of claim 32 wherein the two wire process control loop is in accordance with a digital standard.

41. The scalable transmitter module of claim 32 wherein the scalable transmitter module and the unitized sensor module are completely powered from the two wire process control loop.

42. The scalable transmitter module of claim 30 wherein the circuit completely powers the unitized sensor module with power through feedthrough.

43. A transmitter comprising a unitized sensor module coupled to the scalable transmitter module of claim 30.

44. The transmitter of claim 43 wherein the unitized sensor module, comprises:
a housing adapted to support the unitized sensor module on a process opening, the housing having an outer wall surrounding a cavity and having a fitting integral with the outer wall and adapted to support a scalable transmitter module, the fitting opening to the cavity;
a circuit in the cavity, the circuit having a sensor coupling to the process opening and providing a sensor output; and
a feedthrough sealing the fitting and having external conductors energizing the circuit and providing the sensor output, the sensor output being configurable for local connection to the scalable transmitter module and configurable for direct wiring to a remote receiver.

45. The transmitter of claim 44 further comprising an isolator configured to isolate fluid at the process opening from the sensor.

46. The transmitter of claim 45 wherein the isolator includes a passageway to couple between the sensor and the process opening, the passageway having a shape which provides flameproofing.

47. The transmitter of claim 46 wherein the fitting includes an outer surface adapted to seal to the scalable transmitter module.

48. The transmitter of claim 44 wherein the feedthrough includes a capillary tube sealed to complete flame-proofing of the feedthrough.

49. The transmitter of claim 43 wherein the unitized sensor module is filled with a non flammable gas.

50. The transmitter of claim 43 wherein the fitting extends around the external conductors and is adapted to retain a plug mating with the external conductors.

51. The scalable transmitter module of claim 30 including a serial bus configured to receive the sensor output.

52. The scalable transmitter module of claim 30 wherein the plug comprises between three and five conductors.

53. The scalable transmitter module of claim 30 wherein the circuit is configured to power the united sensor module.

54. A method of manufacturing a scalable transmitter module, comprising:

forming a housing to mount on a unitized sensor module, the housing having an outer wall surrounding a cavity and having a first opening adapted to mount on a fitting of the unitized sensor module and a second opening adapted for connection to a wiring raceway to a remote receiver, and providing openings through the first and second openings to the cavity, and covering the cavity with a removable cover; and installing a circuit in the cavity, the circuit having a plug adapted to mate with a feedthrough of the unitized sensor module, the circuit being adapted to receive a sensor output from the unitized sensor module and generate a scalable output on circuit terminals accessible by removing the cover, the scalable output being adapted for connection to the remote receiver.

55. A method of manufacturing a unitized sensor module, comprising:

providing a housing adapted to support the unitized sensor module on a process opening, providing the housing with an outer wall surrounding a cavity and providing the housing with a fitting adapted to support a scalable transmitter module, and opening the fitting to the cavity;

installing a circuit in the cavity, the circuit having a sensor coupling to the process vessel and providing a sensor output; and sealing a feedthrough in the fitting and providing external conductors on the feedthrough connected to the sensor output, and adapting the conductors for both local connection to a scalable transmitter module and direct wiring to a remote receiver.

56. A unitized sensor module, comprising:

means for housing adapted to support the unitized sensor module on a process opening, the means for housing having an outer wall surrounding a cavity and having a fitting adapted to support a scalable transmitter module, the fitting opening to the cavity;

means for sensing having a circuit in the cavity, the circuit having a sensor coupling to the process vessel and providing a sensor output; and means for connecting having a feedthrough sealing the fitting and having external conductors connected to the sensor output, the conductors being adaptable for both local connection to a scalable transmitter module and direct wiring to a remote receiver.

57. A scalable transmitter module, comprising:

means for housing adapted to mount on a unitized sensor module, the means for housing having an outer wall surrounding a cavity and having a first opening adapted to mount on a fitting of the unitized sensor module and a second opening adapted for connection to a wiring raceway to a remote receiver, and openings through the first and second openings to the cavity, and a removable cover covering the cavity; and sensing means in the cavity, including a circuit having a plug adapted to mate with a feedthrough of the unitized sensor module, the circuit being adapted to receive a sensor output from the unitized sensor module and generate a scalable output on circuit terminals accessible by removing the cover, the scalable output being adapted for connection to the remote receiver.

* * * * *

UNITED STATES PATENT AND TRADEMARK OFFICE
CERTIFICATE OF CORRECTION

PATENT NO.    : 6,457,367 B1
DATED         : October 1, 2002
INVENTOR(S)   : Steven M. Behm et al.

It is certified that error appears in the above-identified patent and that said Letters Patent is hereby corrected as shown below:

<u>Title page,</u>
Item [56], References Cited, U.S. PATENT DOCUMENTS, add the following:

-- 5,248,167     9/1993     Petrich et al. . . . . . . . . . 285/23 --

FOREIGN PATENT DOCUMENTS, add the following:

-- DE     197 45 244 A1     4/1998 --

Signed and Sealed this

Fifteenth Day of April, 2003

JAMES E. ROGAN
*Director of the United States Patent and Trademark Office*